(12) United States Patent
Badiey et al.

(10) Patent No.: US 9,013,959 B2
(45) Date of Patent: Apr. 21, 2015

(54) LONG-RANGE ACOUSTICAL POSITIONING SYSTEM ON CONTINENTAL SHELF REGIONS

(75) Inventors: Mohsen Badiey, Newark, DE (US); Boris Katsnelson, Voronezh (RU)

(73) Assignee: University of Delaware, Newark, DE (US)

( * ) Notice: Subject to any disclaimer, the term of this patent is extended or adjusted under 35 U.S.C. 154(b) by 711 days.

(21) Appl. No.: 13/272,639

(22) Filed: Oct. 13, 2011

(65) Prior Publication Data

US 2012/0092964 A1    Apr. 19, 2012

Related U.S. Application Data

(60) Provisional application No. 61/392,665, filed on Oct. 13, 2010.

(51) Int. Cl.
   G01S 3/80    (2006.01)
   G01S 5/30    (2006.01)

(52) U.S. Cl.
   CPC ......................... G01S 5/30 (2013.01)

(58) Field of Classification Search
   CPC ............................................... G01S 5/30
   USPC .................................... 367/118–129
   See application file for complete search history.

(56) References Cited

U.S. PATENT DOCUMENTS

| | | | |
|---|---|---|---|
| 5,072,427 A * | 12/1991 | Knowles | 367/118 |
| 6,501,704 B2 | 12/2002 | Nishimura | |
| 6,532,192 B1 | 3/2003 | Reid | |
| 7,139,647 B2 | 11/2006 | Larsen | |
| 7,362,653 B2 | 4/2008 | Green | |
| 7,701,803 B2 | 4/2010 | Welker | |
| 2007/0025185 A1 * | 2/2007 | Green et al. | 367/124 |
| 2008/0008045 A1 * | 1/2008 | Basilico | 367/128 |
| 2009/0196122 A1 | 8/2009 | Crowell | |
| 2010/0034054 A1 * | 2/2010 | Wayland et al. | 367/87 |
| 2010/0302907 A1 * | 12/2010 | Brumley | 367/89 |

FOREIGN PATENT DOCUMENTS

| | | |
|---|---|---|
| JP | 8189969 A | 7/1996 |
| JP | 2002131418 A | 5/2002 |

(Continued)

OTHER PUBLICATIONS

Bonnel, J. Acoustical Society of America, 128(2), Aug. 2010, pp. 719-727.*

(Continued)

*Primary Examiner* — Isam Alsomiri
*Assistant Examiner* — Hovhannes Baghdasaryan
(74) *Attorney, Agent, or Firm* — RatnerPrestia

(57) ABSTRACT

Methods and systems for determining a geophysical position of an object in an underwater channel are provided. Acoustic signals from at least two sources are received by a receiver of the object. The acoustic signals have a frequency corresponding to at least one waveguide mode associated with the underwater channel, where the acoustic signals are transmitted at predetermined transmission times. An arrival time for the at least one waveguide mode is determined from the received signals, based on the predetermined transmission times. The geophysical position is determined based on the arrival time and a modal group velocity for the at least one waveguide mode.

26 Claims, 8 Drawing Sheets

(56) References Cited

FOREIGN PATENT DOCUMENTS

| KR | 102005003892 | | 4/2005 |
|---|---|---|---|
| KR | 20080085509 | A | 9/2008 |
| WO | 2007022233 | A2 | 2/2007 |
| WO | 2008005776 | A2 | 1/2008 |

OTHER PUBLICATIONS

Wiggins Canadian acoustics, vol. 32 No. 2 2004, pp. 146-154.*
Siderius http://www.hlsresearch.com/High_Frequency_Conf/HF%/20FINAL%20Papers%20(PDFs)/Final%20-%20Siderius-Porter.pdf, Nov. 21 2008.*
Hall J. Acoustic Soc. Am, 73(1) Jan. 1983, pp. 153-162.*
Alcocer, A. et al., "Study and implementation of an EKF GIB-based underwater positioning system," Control Engineering Practice 15 (2007) 689-701.
Bechaz, C. et al., "Underwater Positioning—Centimetric Accuracy Underwater-GPS," Hydra International, Jul./Aug. 2006, pp. 2-5.
Deferrari, H. A. et al., "Temporal coherence of mode arrivals", JASA Express Letters, J. Acoust. Soc. Am., vol. 124, No. 3, Pt. 2, Sep. 2008, pp. 104-109.
Duda, T. F. et al., "Acoustic Systems for Global Observatory Studies," Oceans 06, Boston, Conference proceedings, IEEE/MTS, Sep. 2006, 6 pp.
Duda, T. F. et al., "Evaluation of a Long-Range Joint Acoustic Navigation/Thermometry System," Proc Oceans 06, Boston, 2006.
Fu, B. et al., "Development of a new underwater positioning system based on sensor network," Artif Life Robotics (2008) 13:45-49.
Headrick, R. H. et al., "Acoustic normal mode fluctuation statistics in the 1995 Swarm internal wave scattering experiment," J. Acoust. Soc. Am. 107 (1), Jan. 2000, pp. 201-220.
Kussat, N. H. et al., "Absolute Positioning of an Autonomous Underwater Vehicle Using GPS and Acoustic Measurements," Journal of Oceanic Engineering, vol. 30, No. 1, Jan. 2005, pp. 153-164.
Morozov, A. K. et al., "Modal processing for acoustic communications in shallow water experiment," JASA Express Letters, J. Acoust. Soc. Am., vol. 124, No. 3, Pt. 2, Sep. 2008, EL177-EL181.
Nguyen, H. B. et al., "Ocean Acoustic Sensor Installation at the South Florida Ocean Measurement Center," IEEE Journal of Oceanic Engineering, vol. 27, No. 2, Apr. 2002, pp. 235-244.
Philippe, F. D. et al., "Construction of the temporal invariants of the time-reversal operator," JASA Express Letters, J. Acoust. Soc. Am. 126 (1), Jul. 2009, pp. EL8-El-13.
Takeuchi, T., "A Long-Range and High Resolution Underwater Acoustic Positioning System." Marine Geodesy, Jul.-Dec. 1990, vol. 14, No. 3-4, pp. 225-231.
Teymorian, A. Y. et al., "Poster Abstract: An Underwater Positioning Scheme for 3D Acoustic Sensor Networks," The Second ACM International Workshop on UnderWater Networks (WUWNet), Sep. 2007.
White, S. N. et al., "Development and deployment of a precision underwater positioning system for in situ laser Raman Spectroscopy in the Deep Ocean," Deep-Sea Research I 52 (2005) 2376-2389.
Yu, S-C. et al., "Visual Inspection of Underwater Structures by Autonomous Underwater Vehicles Based on Positioning Using Artificial Objects Placed on Them," Proceedings of the Fifth (2002) ISOPE Pacific/Asia Offshore Mechanics Symposium, Daejeon, Korea, Nov. 17-20, 2002.
International Application Serial No. PCT/US2011/056113, International Written Opinion mailed Jan. 18, 2012, 3 pgs.
International Application Serial No. PCT/US2011/056113, International Search Report mailed Jan. 18, 2012, 5 pgs.

* cited by examiner

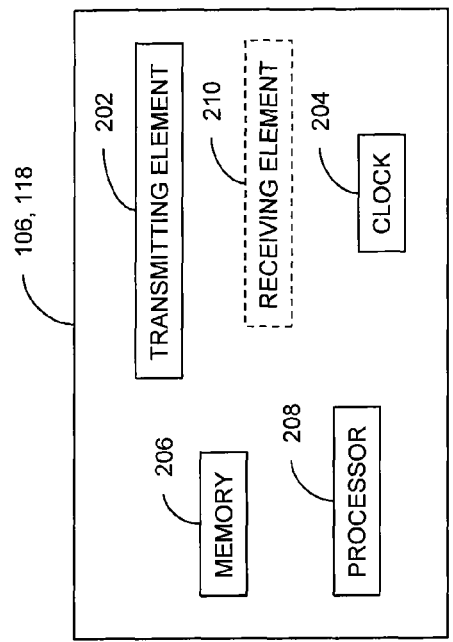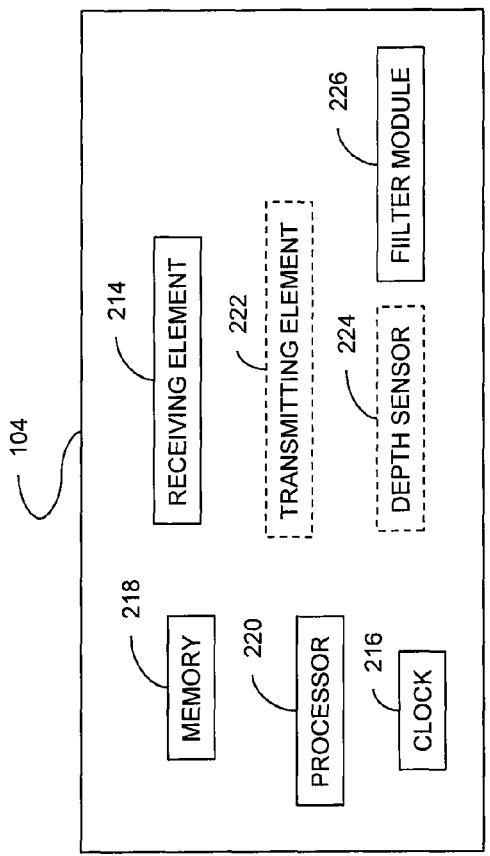

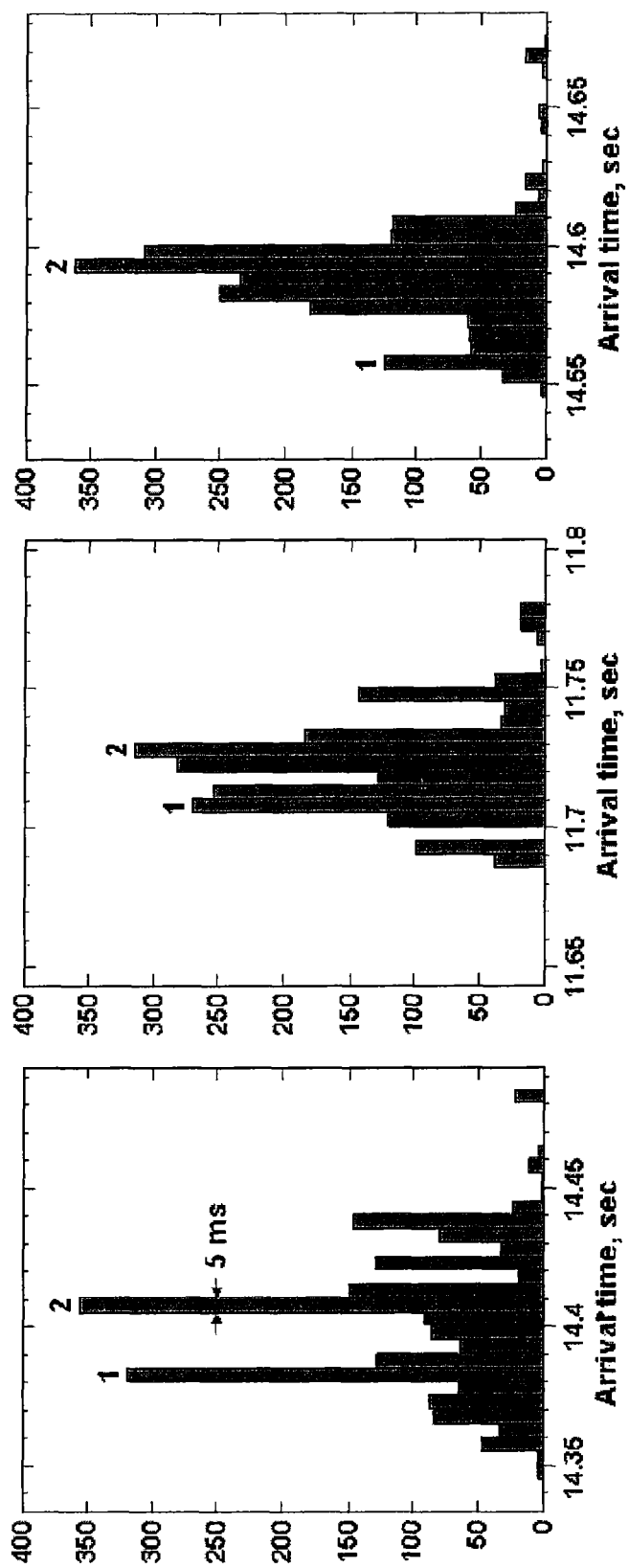

… …

LONG-RANGE ACOUSTICAL POSITIONING SYSTEM ON CONTINENTAL SHELF REGIONS

CROSS REFERENCE TO RELATED APPLICATIONS

This application claims priority to U.S. Provisional Application Ser. No. 61/392,665, entitled "LONG-RANGE ACOUSTICAL POSITIONING SYSTEM ON CONTINENTAL SHELF REGIONS," filed Oct. 13, 2010, incorporated fully herein by reference.

STATEMENT REGARDING FEDERALLY SPONSORED RESEARCH

The present invention was supported in part by Grant Numbers N000140110114, N00014-07-1-0546, and N000141010396 from the Office of Naval Research. The United States Government may have certain rights to the invention.

FIELD OF THE INVENTION

The present invention relates to the field of underwater acoustical positioning and, more particularly, to methods and systems for determining a geophysical position of an object in an underwater channel based on measurement of arrival times for at least one received waveguide mode of the underwater channel.

BACKGROUND OF THE INVENTION

A conventional Global Positioning System (GPS) receiver may provide very accurate position location information on the surface of the Earth. In general, the GPS receiver uses a group of more than two dozen GPS satellites that broadcast precise timing signals (via electromagnetic waves) by radio to electronic GPS receivers, allowing the receivers to accurately determine their location (i.e., latitude, longitude, and altitude) in real time. However, a GPS receiver generally may not be used in underwater environments, because of an extremely high attenuation of electromagnetic waves in sea water.

In contrast to electromagnetic waves, sound signals (acoustic waves) may propagate in water with relatively minimal attenuation. Accordingly, high frequency acoustic techniques are widely used for underwater imaging, as well as for location and positioning of underwater objects mainly for comparatively short ranges (a few km). It is desirable to accurately determine the position of an object over long range distances (a few tens of km) in shallow water channel environments (e.g., where the depth is about 200 m or less), such as in continental shelf regions.

SUMMARY OF THE INVENTION

The present invention is embodied in methods for determining a geophysical position of an object in a shallow water underwater channel. The method includes receiving, by the object, acoustic signals from at least two sources including a frequency corresponding to at least one waveguide mode associated with the underwater channel, where the acoustic signals are transmitted at respective predetermined transmission times. The method also includes determining an arrival time for the at least one waveguide mode from the received acoustic signals, based on the respective predetermined transmission times. The method also includes determining the geophysical position based on the arrival time and a modal group velocity for the at least one waveguide mode.

The present invention is also embodied in a receiver disposed on an object in an underwater channel. The receiver includes a receiving element and a processor. The receiving element receives acoustic signals from at least two sources. Each acoustic signal has a frequency corresponding to at least one waveguide mode associated with the underwater channel. The acoustic signals are transmitted at respective predetermined transmission times. The processor determines an arrival time for the at least one waveguide mode from the received acoustic signals, based on the respective predetermined transmission times. The processor also determines a geophysical position of the object based on the arrival time and a modal group velocity for the at least one waveguide mode.

The present invention is further embodied in an acoustical positioning system for an underwater channel. The acoustical positioning system includes at least two sources for transmitting acoustic signals and a receiver disposed on an object for receiving the acoustic signals from the at least two sources. Each acoustic signal has a frequency corresponding to at least one waveguide mode associated with the underwater channel, where the acoustic signals are transmitted at respective predetermined transmission times. The receiver includes a processor for determining an arrival time for the at least one waveguide mode from the received acoustic signals, based on the respective predetermined transmission times and for determining a geophysical position of the object based on the arrival time and a modal group velocity for the at least one waveguide mode.

Acoustical positioning systems and methods of the present invention may be used, for example, by the navy, for oil exploration, for oceanography, for topography, etc.

BRIEF DESCRIPTION OF THE DRAWINGS

The invention may be understood from the following detailed description when read in connection with the accompanying drawing. It is emphasized that, according to common practice, various features of the drawing may not be drawn to scale. On the contrary, the dimensions of the various features may be arbitrarily expanded or reduced for clarity. Moreover, in the drawing, common numerical references are used to represent like features. Included in the drawing are the following figures:

FIGS. 2A and 2B are functional block diagrams of a respective source and receiver shown in FIGS. 1A and 1B, according to aspects of the present invention;

FIGS. 6A, 6B and 6C are example histograms illustrating arrival times of various waveguide modes received by a receiver, according to an aspect of the present invention.

DETAILED DESCRIPTION OF THE INVENTION

Figure 1A:
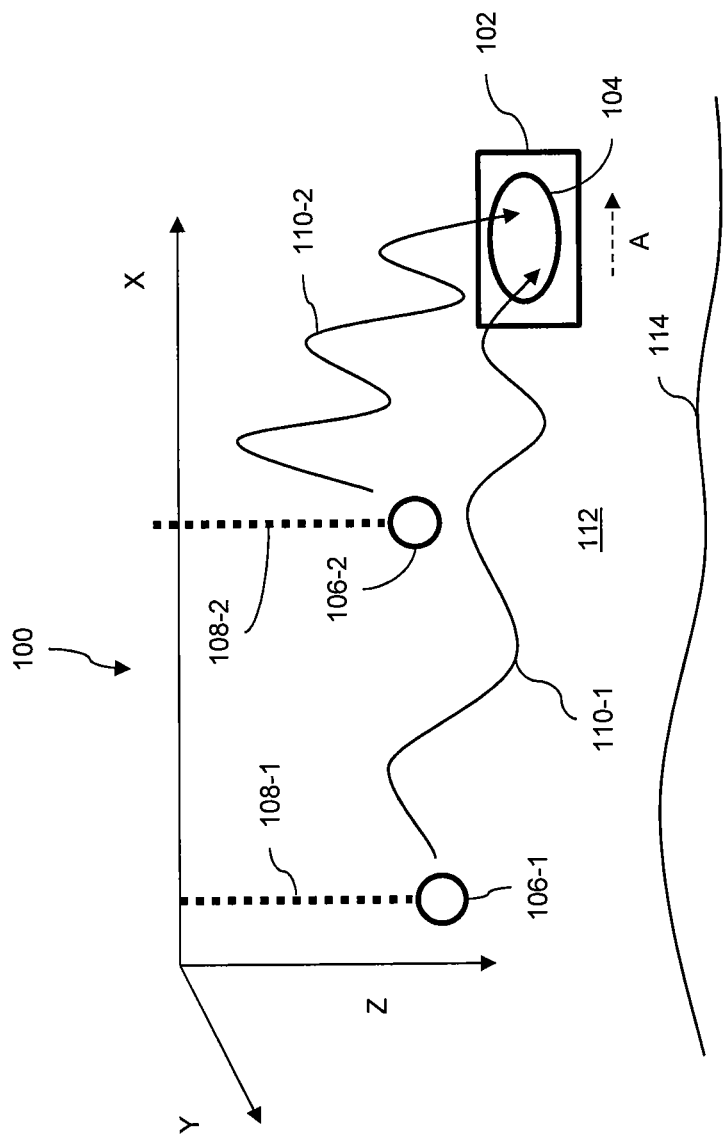
FIGS. 1A and 1B are a perspective view diagrams illustrating an exemplary acoustical positioning system, according to aspects of the present invention.

Conventional acoustical positioning systems typically transmit a high frequency (about 10 kHz) acoustic signal and determine either the time of arrival of the acoustic signal at the object or the round trip time of the acoustic signal back to a transceiver (i.e., after it has been reflected from object). If the position of the transceiver is known, the arrival time (or round trip time) of the object may be used to determine a ranges of the object to the transceivers using a relationship between propagation time and distance as for free space using a local (or an average) value of the sound speed. With at least three transceivers, using a simple triangulation scheme, a three-dimensional (3D) position of the object may be determined. Conventional acoustical positioning systems are typically capable of determining the object's position over a short distance (not more than a few km).

An exemplary system of the present invention may be used for long-range (up to about 50-100 km) positioning in a shelf zone of the ocean. According to an aspects of the invention, at least two sound sources having transmitting elements may be used to transmit low frequency acoustic signals to an object in an underwater channel at predetermined transmission times. Each acoustic signal may have a frequency corresponding to at least one waveguide mode associated with the underwater channel. The object may include a receiver including a receiving element (or a transmitting element and a receiving element, i.e., a transceiver) and a processor. The receiver may also include a memory. Each sound source and the receiver may include precise (e.g., atomic or quartz) clocks that may be synchronized with each other. According to an exemplary embodiment, in operation, the receiver may determine an arrival time of at least one waveguide mode, for each acoustic signal received from the respective source, based on the respective predetermined transmission time. The receiver may determine the geophysical position of the object based on the respective arrival times and a group velocity for the at least one waveguide mode. The group velocity may be determined using a measured sound speed profile or an estimated (archival) sound speed profile and by assuming a waveguide propagation of acoustic signals in the underwater channel. According to one embodiment, an operation area using the exemplary system may be up to a few tens of km (for example 50×50 km and more).

According to aspects of the invention, the acoustic signals used are generally low frequency signals, less than about 500 Hz, more preferably between about 100 Hz to 500 Hz. For shallow water channels (e.g., with a depth less than or equal to about 200 m), low frequency acoustic signals have small attenuation in comparison with signals at mid and high frequencies. For example, an attenuation coefficient of low frequency signals in a shallow water waveguide, under realistic conditions may be about 0.05-0.1 dB/km. At the same time, for a frequency of about 10 kHz, the attenuation coefficient may be more than 1 dB/km (in other words 10-20 times greater than for low frequencies). A similar ratio occurs with respect to propagation distance for low frequencies as compared with mid and higher frequencies.

In general, exemplary acoustical positioning systems of the present invention may use low frequency acoustic signals in shallow water areas (such as coastal areas) where propagation of sound signals has a waveguide character. Based on a measurement (or estimate) of the sound speed profile with respect to a depth of the channel, a waveguide propagation model of the channel may be established and modal group velocities of waveguide modes may be determined.

Referring to FIG. 1, an exemplary acoustical positioning system, designated generally as system 100, is described. System 100 may include object 102 having receiver 104 and at least two sources 106-1, 106-2 in underwater channel 112 (also referred to herein as shallow water channel 112). Underwater channel 112 has a depth H to bottom surface 114. Sources 106-1, 106-2 may be located at fixed and precisely known positions around an area of operation of underwater channel 112. According to an exemplary embodiment, sources 106-1, 106-2 may be positioned at a distance of about 30-40 km relative to each other.

Object 102 represents any object for which a geophysical position may be detected. Object 102 may include, for example, an autonomous underwater vehicle (AUV). Although one object 102 is shown, it is understood that system 100 may include a plurality of objects 102 for which respective geophysical positions may be detected. Object 102 may be stationary or may be in motion (indicated by dashed arrow A).

Sources 106-1, 106-2 may be configured to transmit respective acoustic signal 110-1, 110-2 through underwater channel 112. Acoustic signals 110-1, 110-2 may be of low frequency (i.e., having a low frequency component (e.g., 100-500 Hz)). Acoustic signals 110-1, 110-2 may be received by receiver 104 and used to determine the geophysical position of object 102 (described further below).

System 100 may optionally include one or more vertical chains of thermistors, for example, thermistor strings 108-1, 108-2. Thermistor strings 108-1, 108-2 may be connected to respective sources 106-1, 106-2 or may be positioned in an operating area proximate sources 106-1, 106-1. As described further below, thermistor strings 108-1, 108-2 may be used to measure a sound speed profile associated with sources 106-1, 106-2.

Referring next to FIGS. 2A and 2B, function block diagrams of source 106 and receiver 104 are shown.

As shown in FIG. 2A, each source 106 may include a transmitting element 202 (e.g., a transducer) for transmitting acoustic signal 110 (FIG. 1A) and clock 204. Source 106 may also include one or more of memory 206 and processor 208. Memory 206 may store a sound speed profile for source 106. Processor 208 may, for example, control transmission of acoustic signal 110 (FIG. 1A) from transmitting element 202 at predetermined transmission times, responsive to clock 204. Source 106 may optionally include receiving element 210 (e.g., a hydrophone) for receiving an acoustic signal (for example from another source 110) or from receiver 104.

As shown in FIG. 2B, receiver 104 may include receiving element 214 (e.g., a hydrophone) for receiving the acoustic signal 110 (FIG. 1A) transmitted by source 106, clock 216, processor 220 for determining the geophysical position of object 102 and memory 218. Memory 218 may store, for example, one or more modal group velocities, and the predetermined transmission times of each source 106 (FIG. 1A). Receiver 104 may optionally include transmitting element 222 (e.g., a transducer) for transmitting an acoustic signal (for example to sources 106-1, 106-2 (FIG. 1A) and/or to a remote observer). Receiver 104 may optionally include depth sensor 224 (e.g., a hydrostatic pressure sensor) to measure a depth of object 102 (FIG. 1A) in underwater channel 112. Receiver 104 may also include filter 226 for Receiver 104 may also include filter module 226 for distinguishing mode separation upon receipt of the acoustic signals 110-1, 110-2 (FIG. 1A). It may be desirable to distinguish the mode separation, because a maximal difference in group velocities of propagating waveguide modes for example (1st and 6th) may reach about 15 m/s (that gives a difference in arrival times of separate modal pulses of about 0.2-0.4 s for distances about 20 km). The separation of waveguide modes may be performed using standard methods of signal processing (such as via bandpass or notch filters of filter module 226) and separation of modal pulses in time or using radiation of separate modes.

Referring generally to FIGS. 2A and 2B, each source 106 and receiver 104 may include respective clocks 204, 216 (such as an atomic clock or an oscillator circuit). According to an exemplary embodiment all clocks 204, 216 in system 100 may be precisely synchronized with each other. Although not shown, receiver 104 may receive sound speed profiles from sources 106, either directly or via a remote observer, where the sound speed profiles may be used to determine the modal group velocities, described further below.

Each processor 208, 220 may include, for example, a logic circuit, a digital signal processor or a microprocessor. Suitable transmitting elements, 202, 222, receiving elements 210, 214, clocks 204, 216, memories 206, 218, processors 208, 220 and depth sensor 224 may be understood by the skilled person from the description herein.

Referring back to FIG. 1A, acoustic signals 110-1, 110-2 that are transmitted from respective sources 106-1, 106-2 may include a frequency corresponding to at least one waveguide mode associated with the channel. Acoustic signals 110-1, 110-2 may be narrowband or broadband signals. Acoustic signals 110-1, 110-2 may include a plurality of pulses repeated periodically, such as a linear frequency modulated (LFM) signal (e.g., a chirp) or may include a continuous signal, such as a pseudorandom binary sequence (e.g., a maximum length sequence (MLS)). Acoustic signals 110-1 and 110-2 may be transmitted simultaneously from respective sources 106-1 and 106-2 or may be transmitted at different time intervals. According to another embodiment, each source 106-1, 106-2 may transmit a different waveguide mode (either simultaneously or at different time intervals).

According to one exemplary embodiment, system 100 may be used such that object 102 (which may be moving) may determine its position by receiving acoustic signals 110-1, 110-2 from respective sources 106-1, 106-2 (for example via receiving element 214 (FIG. 2B). According to another exemplary embodiment, object 102 (which may be moving) may include a transmitting element (for example transmitting element 222 shown in FIG. 2B), such that a remote observer (having a set of receivers) (for example one of sources 106 having receiving element 210 (FIG. 2A)) may determine the geophysical position of object 102. In general, because of the reciprocity of sound propagation theory, these different embodiments are mathematically equivalent.

Acoustical positioning system 100 of the present invention uses the theory of shallow water sound propagation, where the received signals may be represented by a superposition of separate modal pulses. Each modal pulse may have a different vertical distribution of intensity and different group velocities (denoted $v_l^{gr}(\omega)$, where $\omega$ represents the angular frequency and $l$ is an integer representing the mode number), depending on the sound speed profile (and frequency). Typically, the first mode has a maximal group velocity.

To improve the accuracy of the exemplary method for determining the geophysical position of object 102, additional fixed sources may be used. According to one example embodiment, two sources (for example sources 106-1, 106-2) may be used to determine the horizontal coordinates of the object (i.e., in the X and Y directions). A vertical coordinate Z of the object may be determined by an additional sensor capable of measuring depth (e.g., depth sensor 224 (FIG. 2B)).

Figure 1B:
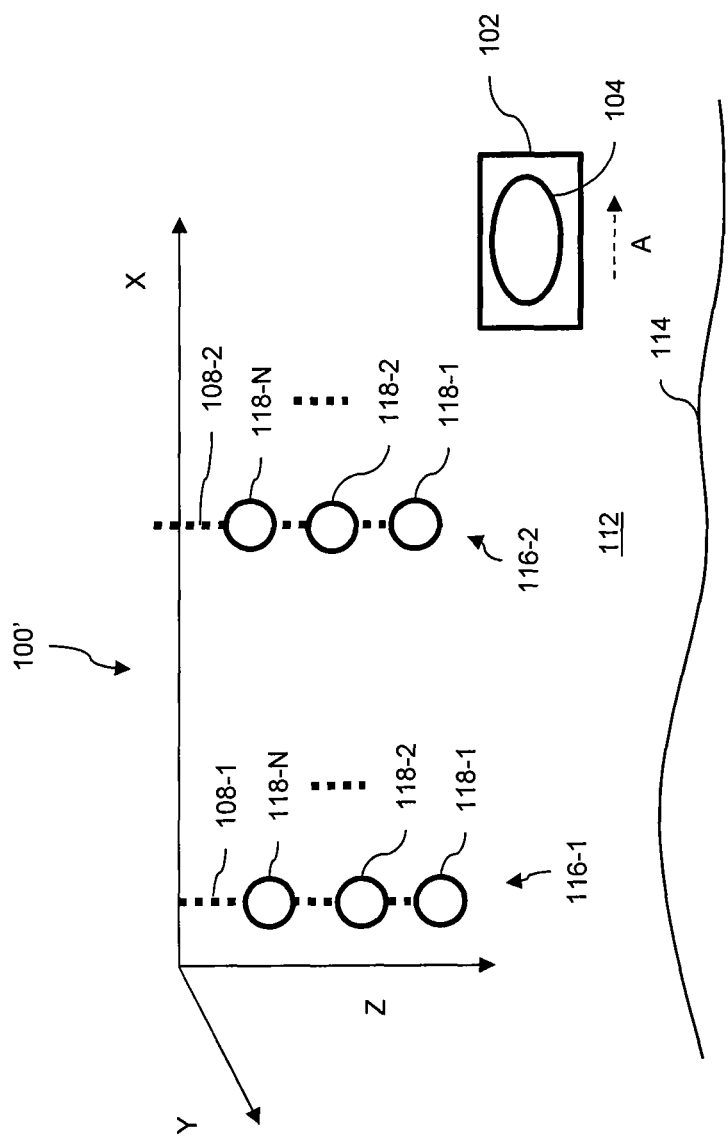

Referring to FIG. 1B, acoustical positioning system 100' (also referred to herein as system 100') is shown, according to another embodiment. System 100' is similar to system 100, except that system 100' includes first and second arrays 116-1, 116-2 of vertically arranged sources 118. Arrays 116-1, 116-2 may be used to enhance mode separation at receiver 104 and/or to enhance the radiation of separate (i.e., different) waveguide modes. Each array 116 may include a plurality of sources 118-1, 118-2, . . . , 118-N, where N is an integer. In general, N may be greater than or equal to 2. Each source 118 may include the same components (shown in FIG. 2A) as described above with respect to source 106.

Referring back to FIG. 1A, the sound speed profile may be determined for each source 106-1, 106-2. The sound speed profile may be a function of temperature, salinity and hydrostatic pressure. For a typical shallow water channel 112, hydrostatic pressure and salinity may provide a small contribution. Accordingly, the sound speed profile may be determined by the temperature of channel 112 as a function of depth. Thus, on the basis of temperature, the modal structure of the sound field in the operating area of underwater channel 112 may be determined and used to calculate the modal group velocities of the separate waveguide modes.

The sound speed profile may be estimated based on archival records for the region. For example, the records may provide an indication of the sound speed profile at different times of the day as well as for different seasons. Alternatively, or in combination, the SSP may be measured for each source 106-1, 106-2, for example by a plurality of thermistors (such as thermistor strings 108-1, 108-2). If the shallow water channel 112 is relatively time-invariant, for example, the archival records may provide an adequate estimate of the sound speed profile.

If the shallow water channel 112 is relatively variable with time, measurements of the sound speed profile as a function of depth at the fixed sources 106-1, 106-2 may be performed, for example, every couple of minutes. Accordingly, an adequate model of a variable medium and calculations of group velocities of separate waveguide modes may be updated every couple of minutes.

It is understood that the accuracy of acoustical positioning system 100 and exemplary methods for determining the geophysical position of object 102 described herein, as well as any conventional acoustical positioning method, may depend on how precisely the group velocities of the waveguide modes are known. For example, an error in 5 m/s for a group velocity may generate an error in positioning of more than 100 m at a distance of about 20 km between source 106 and object 102 (at receiver 104). The error may be reduced by using possibly precise measurements of the sound speed profile, such as by thermistor strings 108-1, 108-2.

The water medium may have dynamic motion due to different types of oceanographic phenomena (internal waves, currents, fronts, etc.) that may lead to fluctuations of arrival time. Based on previous research, field measurements have shown that fluctuations of arrival times of sound pulses during a long time period (e.g., many hours) were not more than 10 ms, giving about 15 m accuracy in 20 km range.

Figure 3:
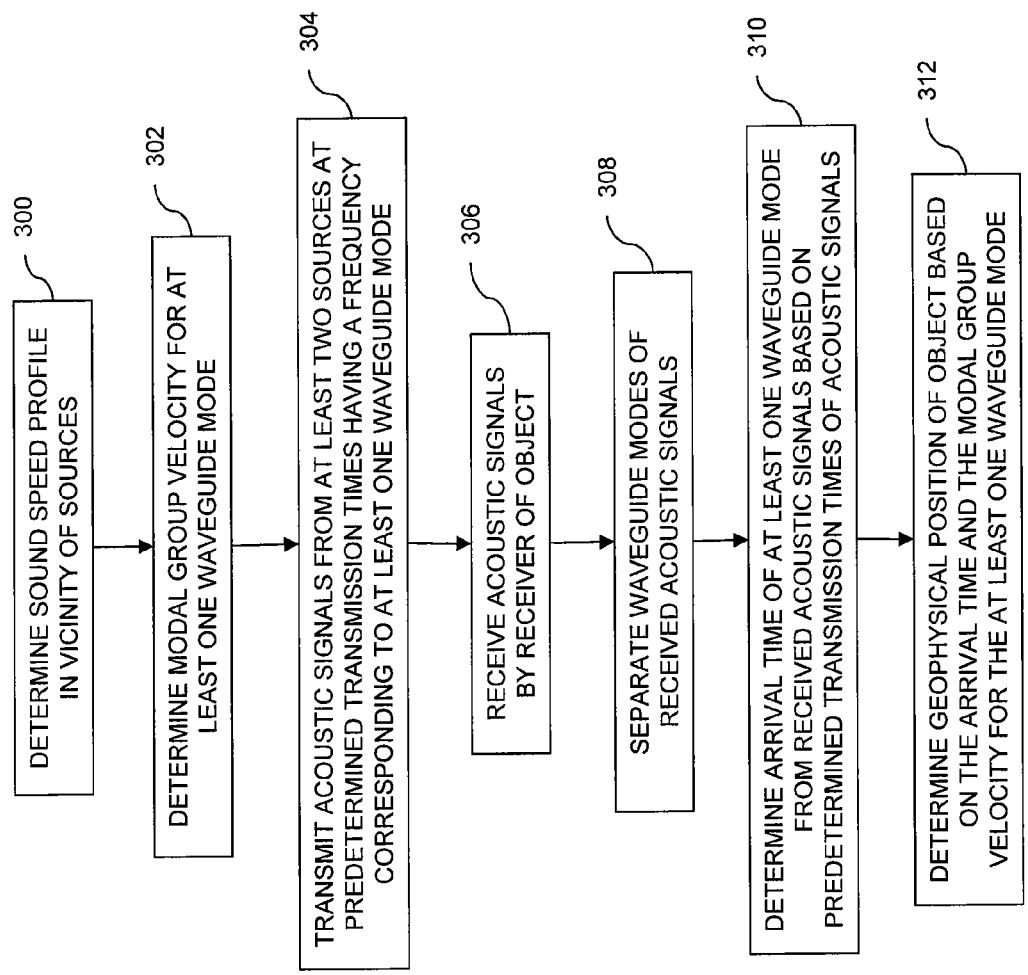
FIG. 3 is a flow chart diagram illustrating an exemplary method for determining a geophysical position of an object in an underwater channel, according to an aspect of the present invention.

Referring next to FIG. 3, an exemplary method for determining a geophysical position of an object in an underwater channel is shown. The steps illustrated in FIG. 3 represent an example embodiment of the present invention. It is understood that certain steps may be performed in an order different from what is shown.

At step 300, a sound speed profile may be determined in the vicinity of sources 106 (FIG. 1A). For example, sound speed profiles may be estimated (as described above) or measured (such as via thermistor strings 106-1 shown in FIG. 1A) via processor 208 (FIG. 2A) of corresponding source 106. The sound speed profile may be stored in memory 206 (FIG. 2A) of corresponding source 106.

At step 302, modal group velocity may be determined for at least one waveguide mode, for example, by processor 220 (FIG. 2A) of receiver 104. The modal group velocity may be determined from the sound speed profiles of sources 106 (FIG. 1A).

At step 304, acoustic signals (for example acoustic signals 110-1, 110-2 shown in FIG. 1A) may be transmitted from at least two sources 106-1, 106-2 (for example by transmitting element 202 (FIG. 2A). The acoustic signals may include a frequency corresponding to at least one waveguide mode associated with underwater channel 112 (FIG. 1A). Acoustic signals 110-1, 110-2 (FIG. 1A) may be transmitted from sources 106-1, 106-2 at a predetermined transmission times.

At step 306, the acoustic signals (transmitted by sources 106-1, 106-2 (FIG. 1A)) may be received by receiver 104 (FIG. 2B) (for example, by receiving element 214). At step 308, waveguide modes of the received acoustic signals may be separated, for example by filter module 226 (FIG. 2B) of receiver 104.

At step 310, an arrival time may be determined for at least one waveguide mode from the received signal, based on the predetermined transmission times, for example, by processor 220 (FIG. 2B) of receiver 104. At step 312, a geophysical position of the object may be determined based on the arrival time (step 310) and the modal group velocity for the at least one waveguide mode.

Figure 4:
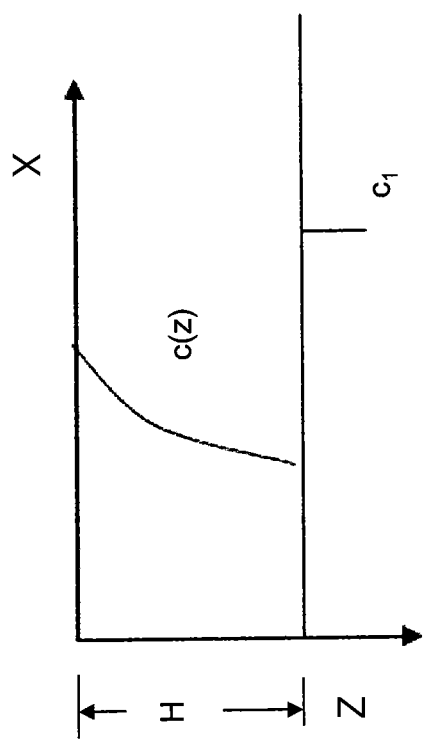
FIG. 4 is a cross sectional diagram of an example shallow water channel having a sound speed profile (SSP), for illustrating the relationship between sound speed and group velocity, according to an aspect of the present invention.

Referring to FIG. 4, a cross sectional diagram of an example shallow water channel having a sound speed profile is shown. The shallow water sound channel includes depth H, sound speed profile $c(z)$, density $\rho_0$, attenuation coefficient in water $\beta$, and a bottom region, characterized by density $\rho_1$, sound speed $c_1$ and attenuation coefficient $\alpha_1$.

For a sound source of power $W_0$ with constant frequency $\omega$ placed at depth $z_0$, then the sound field from this source at the distance r will have the form:

$$P_\omega(r, z, t) = i\sqrt{\rho_0 c_0 W_0} \sum_l \frac{\psi_l(z_0)\psi_l(z)}{\sqrt{\xi_l r}} \exp[i(q_l r - \pi/4 - \omega t) - (\gamma_l/2 - \beta)r] \quad (1)$$

where $c_0$ is the sound speed at the point of the source, functions $\psi_l(z)$ and complex values $\xi_l = q_l + i\gamma_l/2$ are solutions of the Sturm-Liouville problem:

$$\frac{d^2\psi_l(z)}{dz^2} + [k^2(z) - \xi_l^2]\psi_l(z) = 0, \quad (2)$$

$$\psi_l(z)|_{z=0} = 0, \quad (3)$$

$$\left[\psi_l(z) + g(\xi_l)\frac{d\psi_l(z)}{dz}\right]_{z=H} = 0. \quad (4)$$

Here, the value $$g(\xi) = \frac{m_1}{\sqrt{\xi^2 - k_1^2}}$$

is determined by the bottom properties, $m_1 = \rho_1/\rho_0$ and complex value $k_1 = \omega/c_1$ due to bottom attenuation. $\gamma_l$ are referred to as modal attenuation coefficients. For shallow water, low frequency parameter $\beta$ is typically much less than $\gamma_l$.

The sound field of a one-frequency source may be represented by a sum (or a superposition) of waveguide modes. For a radiated pulse with a spectrum $S(\omega)$, the resulting sound field may be obtained by using a conventional Fourier transform and the total signal may be decomposed as pulses of separate modes, as:

$$P(r, z, t) = \int S(\omega)P_\omega(r, z, t)d\omega = \sum_l P_l(r, z, t) \quad (5)$$

where the modal pulse may be represented by:

$$P_l(r, z, t) = i\sqrt{\rho_0 c_0 W_0} \quad (6)$$
$$\int S(\omega)\frac{\psi_l(z_0)\psi_l(z)}{\sqrt{\xi_l r}}\exp[i(q_l r - \pi/4 - \omega t) - (\gamma_l/2 - \beta)r]d\omega$$

Every pulse $P_l(r,z,t)$ may propagate with a different velocity, which for comparatively narrow spectrum may be determined by the expression:

$$v_l^{gr} = \left(\frac{dq_l}{d\omega}\right)^{-1} \quad (7)$$

Under real conditions, group velocities of different modes may decrease with increasing mode number. Accordingly a first mode that reaches the object is typically mode $l=1$. For example, for conditions of the Atlantic shelf for the frequency of about 300 Hz, group velocities of separate modes are presented in Table 1 below. As Table 1 indicates, differences between group velocities for different modes may be significant.

TABLE 1

| 1 | $v_i^{gr}$, m/s |
|---|---|
| 1 | 1499.2 |
| 2 | 1496.7 |
| 3 | 1492.8 |
| 4 | 1488.2 |
| 5 | 1484.6 |
| 6 | 1480.6 |

According to one experiment carried out in an area of the NJ continental shelf, a set of single hydrophones (i.e., receiving elements) where fixed in a known position. A moving source, fixed at the Research Vessel R/V Sharp, was used. A position of the moving source was also known rather precisely from the ship's regular Global Positioning System (GPS). Table 2 illustrates the source-receiver geometry for the experiment. The source produces LFM signals, with a pulse duration of 2.048 s, a frequency band Of 300±30 Hz, and with a time between signals of 4.096 s.

TABLE 2

| | Water depth (m) | Source-receiver depth (m) | Distance to source (m) |
|---|---|---|---|
| Source | 82.5 | 72.0 | 0 |
| Hydrophone 1 | 85.0 | 78.0 | 21,563 |
| Hydrophone 2 | 82.0 | 75.0 | 17,617 |
| Hydrophone 3 | 67.9 | 60.0 | 21,855 |

Figures 5A, 5B, 5C:
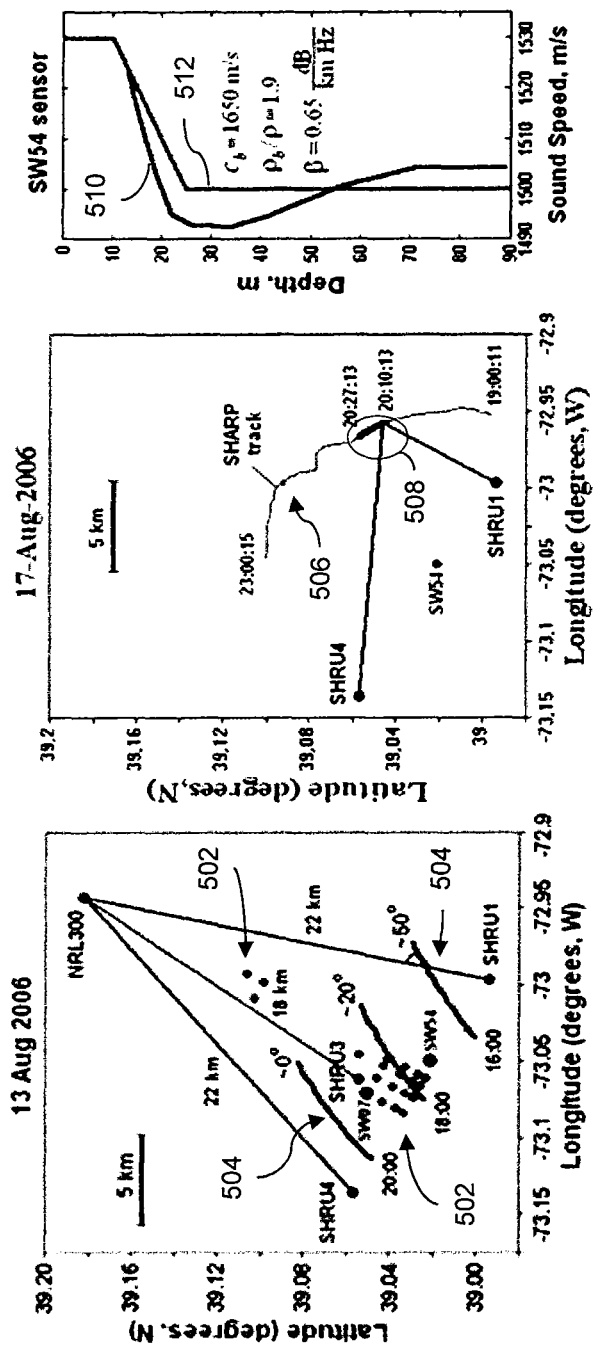
FIGS. 5A and 5B are example graphs of latitude as a function of longitude illustrating positions of a source and receivers for a fixed source and for a moving source, respectively, according to an aspect of the present invention.
FIG. 5C is an example graph of depth as a function of sound speed illustrating measured and modeled sound speed profiles for the operating region of the source and receivers shown in FIGS. 5A and 5B, according to an aspect of the present invention.

Referring to FIGS. 5A-5C, positions of the source and hydrophones, as well as the sound speed profile for the operating area for the experiment, are shown. FIG. 5A illustrates a layout of a fixed source experiment using a source (NRL300) with receivers (i.e., hydrophones) located about 20 Km away at hydrophone 1 (SHRU1), hydrophone 2 (SHRU3), and hydrophone 3 (SHRU4). Circles 502 show the locations of temperature profilers. Curves 504 denote positions of the leading internal waves at times 16:00, 18:00, and 20:00 respectively. SW54 is a thermistor chain used to determine the sound speed profile. FIG. 5B illustrates a layout of a moving source experiment, where the source is tethered from the Research Vessel SHARP. A track of the source is recorded using a conventional on board Global Positioning System and is shown by thin curve 506. Region 508 having the thick curve denotes a part of the track considered for determining the geophysical position of a moving source. FIG. 5C illustrates an average sound speed profile (curve 510) at the point SW54 and a model of the sound speed profile (curve 512). Parameters of the waveguide are shown in FIG. 5C, where $c_b$ is the sound speed (1650 m/s), $\rho_b/\rho$ is seabed to water density ratio (1.9), and $\beta$ is the acoustic attenuation coefficient $$\left(0.65 \frac{dB}{km\,Hz}\right).$$

Using acoustical data of this experiment, fluctuations of arrival times were estimated for a long time period (more than 8.5 hours) (including periods of existence of significant perturbation of the water layer by nonlinear internal waves). Corresponding group velocities and amplitudes of separate modes reaching a respective hydrophone for a fixed source/fixed hydrophone (hydrophone 3) and for a moving source/fixed hydrophone (hydrophone 1) are shown in Table 3 below.

FIGS. 6A-6C are histograms summarizing all of the pulses for hydrophones 1-3 during the entire observation period. In particular, FIG. 6A is a histogram for hydrophone 1; FIG. 6B is a histogram for hydrophone 2; and FIG. 6C is a histogram for hydrophone 3. In FIGS. 6A-6B, two intense peaks (e.g., peaks 1 and 2) correspond to different arrival times for two different modes. Fluctuations of the arrival times may be determined from the histograms shown in FIGS. 6A-6C. The fluctuations in the arrival times were determined to be not more than 5 ms for hydrophone 1 and up to 10 ms for hydrophones 2 and 3.

TABLE 3

| | Fixed Source-fixed Hydrophone 3 | | Moving Source-Fixed Hydrophone 1 | |
|---|---|---|---|---|
| Mode | Group velocity (m/s) | Modal amplitude | Group velocity (m/s) | Modal amplitude |
| 1 | 1499 | 0.86 | 1499 | 0.08 |
| 2 | 1497 | 1.00 | 1497 | 0.27 |
| 3 | 1493 | 0.22 | 1493 | 0.51 |
| 4 | 1489 | 0.11 | 1488 | 0.76 |
| 5 | 1487 | 0.14 | 1485 | 1.00 |
| 6 | 1484 | 0.09 | 1481 | 0.97 |
| 7 | 1475 | 0.03 | 1471 | 0.45 |
| 8 | 1462 | 0.00 | 1457 | 0.06 |

Next a position of the ship (R/V Sharp) was established using acoustical data. The calculated trajectory of the ship was compared with the actual trajectory (using standard GPS). The accuracy of the exemplary method was about 10-15 m for a fixed and a moving ship.

Figure 7B:
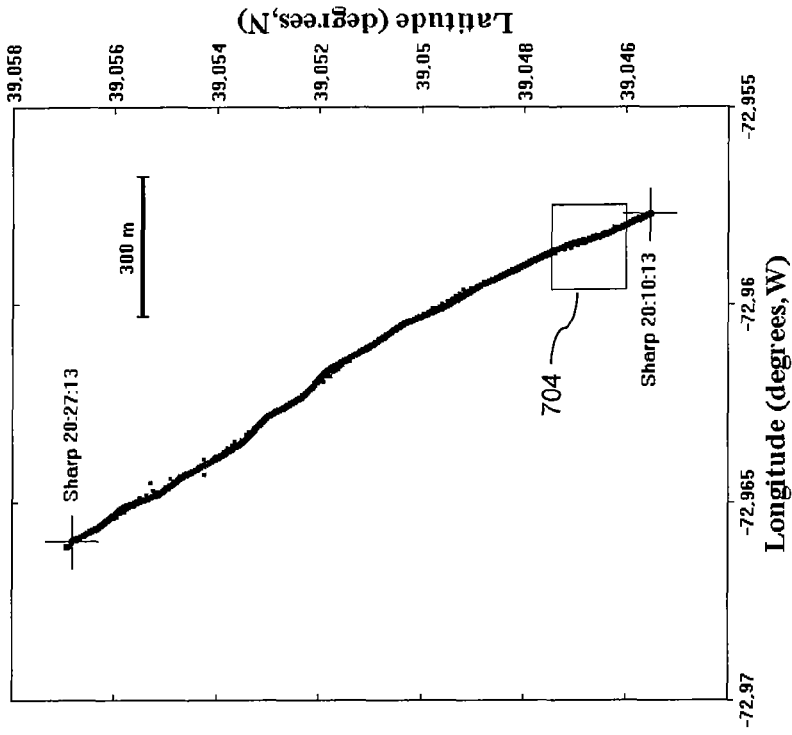
FIGS. 7A, 7B and 7C are example graphs of latitude as a function of longitude illustrating geophysical positions determined for fixed and moving sound sources, respectively, according to an aspect of the present invention.
Figure 7A:
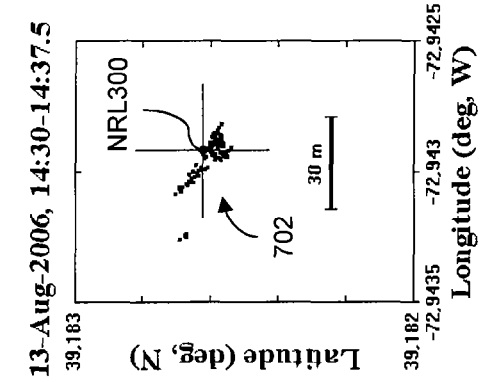
Figure 7C:
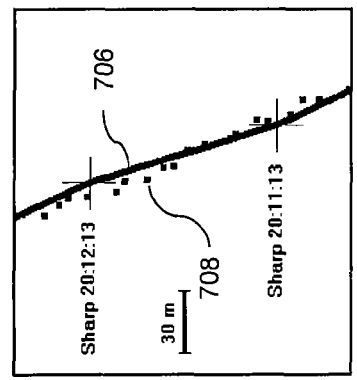

FIGS. 7A-7C illustrate examples of geophysical position determination of the sound source using an exemplary method of the present invention, for stationary and moving sources (with fixed receiver). FIG. 7A illustrates geophysical position results for a fixed sound source (NRL300) and a fixed receiver. Dots 702 show the position of the source as determined by the receiver during 7.5 minutes of chirp signal transmission. The accuracy of the positioning system is less than 15 m in about a 20 km range. FIG. 7B illustrates results for a moving sound source (tethered to the ship Sharp) and a stationary receiver. FIG. 7C illustrates results for the moving source for the enlarged region 704 of FIG. 7B. Solid line 706 is the ship's regular GPS location recoded and dots 708 show the geophysical position results obtained using an exemplary method of the present invention. Dots 708 in FIG. 7C indicate an accuracy of about a few meters in 8 km range.

Although the invention has been described in terms of systems and methods for determining a geophysical position of an object in an underwater channel, it is contemplated that one or more steps and/or components may be implemented in software for use with microprocessors/general purpose computers (not shown). In this embodiment, one or more of the functions of the various components and/or steps described above may be implemented in software that controls a computer. The software may be embodied in non-transitory tangible computer readable media (such as, by way of non-limiting example, a magnetic disk, optical disk, hard drive, etc.) for execution by the computer.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for determining a geophysical position of an object in an underwater channel, the method comprising:

receiving, by the object, acoustic signals from at least two sources, each received acoustic signal including one or more waveguide modes associated with the underwater channel excited by a frequency of the respective acoustic signal transmitted through the underwater channel, the acoustic signals being transmitted at respective predetermined transmission times;

identifying a waveguide mode among the one or more waveguide modes in the received acoustic signals;

determining a modal group velocity corresponding to the identified waveguide mode, based on a sound speed profile of each source and a frequency of the identified waveguide mode from the received acoustic signals;

determining an arrival time for the identified waveguide mode from the received acoustic signals, based on the respective predetermined transmission times; and determining the geophysical position based on the arrival time of the identified waveguide mode and the modal group velocity for the identified waveguide mode.

2. The method according to claim 1, further comprising determining the sound speed profile of each source.

3. The method according to claim 2, wherein the sound speed profile of each source is determined as a function of temperature relative to depth of the underwater channel.

4. The method according to claim 3, wherein the determining of the sound speed profile of each source includes:
measuring the sound speed profile of each source using a thermistor string in an operation area associated with the at least two sources.

5. The method according to claim 3, wherein the determining of the sound speed profile of each source includes:
estimating the respective sound speed profile based on predetermined temperature values for an operation area associated with the at least two sources.

6. The method according to claim 1, wherein the geophysical position of the object is determined relative to the at least two sources for a range of less than or equal to about 100 km.

7. A receiver disposed on an object in an underwater channel comprising:
a receiving element configured to receive acoustic signals from at least two sources, each received acoustic signal including one or more waveguide modes associated with the underwater channel excited by a frequency of the respective acoustic signal transmitted through the underwater channel, the acoustic signals being transmitted at respective predetermined transmission times; and
a processor configured to:
identify a waveguide mode among the one or more waveguide modes in the received acoustic signals;
determine a modal group velocity corresponding to the identified waveguide mode, based on a sound speed profile of each source and a frequency of the identified waveguide mode from the received acoustic signals;
determine an arrival time for the identified waveguide mode from the received acoustic signals, based on the respective predetermined transmission times, and
determine a geophysical position of the object based on the arrival time of the identified waveguide mode and the modal group velocity for the identified waveguide mode.

8. The receiver according to claim 7, further comprising a clock synchronized with respective clocks of the at least two sources.

9. The receiver according to claim 7, further comprising a memory for storing at least one of the predetermined transmission time for each source and modal group velocities for a plurality of waveguide modes.

10. The receiver according to claim 7, further comprising a transmitting element for transmitting a further acoustic signal to a remote observer,
wherein the further acoustic signal and one or more of the acoustic signals from the respective at least two sources are received by the remote observer and used to determine the geophysical position of the object.

11. The receiver according to claim 7, wherein the sound speed profile is a function of temperature relative to depth of the underwater channel.

12. The receiver according to claim 7, further comprising a depth sensor for determining a depth of the object in the underwater channel.

13. The receiver according to claim 7, wherein the geophysical position of the object is determined relative to the at least two sources for a range of less than or equal to about 100 km.

14. The receiver according to claim 7, wherein the object includes an autonomous underwater vehicle (AUV).

15. An acoustical positioning system for an underwater channel comprising:
at least two sources configured to transmit acoustic signals, each acoustic signal including a frequency to excite one or more waveguide modes associated with the underwater channel, the acoustic signals being transmitted at respective predetermined transmission times; and
a receiver disposed on an object configured to receive the acoustic signals from the at least two sources, each received acoustic signal including the one or more waveguide modes excited via the respective source, the receiver including:
a processor configured to:
identify a waveguide mode among the one or more waveguide modes in the received acoustic signals;
determine a modal group velocity corresponding to the identified waveguide mode, based on a sound speed profile of each source and a frequency of the identified waveguide mode from the received acoustic signals;
determine an arrival time for the identified waveguide mode from the received acoustic signals, based on the respective predetermined transmission times; and
determine a geophysical position of the object based on the arrival time of the identified waveguide mode and the modal group velocity for the identified waveguide mode.

16. The system according to claim 15, wherein each of the at least two sources and the receiver includes clocks synchronized with each other.

17. The system according to claim 15, wherein each source includes a memory for storing at least one of the respective predetermined transmission time and the sound speed profile associated with the source.

18. The system according to claim 15, wherein each source includes a further processor for determining the sound speed profile associated with the respective source, the sound speed profile being a function of a temperature relative to a depth of the underwater channel.

19. The system according to claim 18, wherein the at least two sources are associated with at least one thermistor string, and, the further processor determines the sound speed profile for each source based on temperature values from the at least one thermistor string.

20. The system according to claim 18, wherein the further processor determines the sound speed profile based on predetermined temperature values for an operation area associated with the at least two sources.

21. The system according to claim 18, wherein:
the receiver includes a transmitting element for transmitting a further acoustic signal,
one or more of the at least two sources includes a receiving element for receiving the further acoustic signal and the acoustic signals from the remaining sources, and
the further processor determines the geophysical position of the object.

22. The system according to claim 15, wherein one or more of the at least two sources includes an array of sources for transmitting respective acoustic signals.

23. The system according to claim 15, wherein the frequency corresponding to the at least one waveguide mode is less than or equal to about 500 Hz.

24. The system according to claim 15, wherein each source transmits the respective acoustic signal at a same time.

25. The system according to claim 15, wherein one or more of the at least two sources transmits the respective acoustic signal at a different time.

26. The system according to claim 15, wherein one or more of the at least two sources transmits the respective acoustic signal with a further frequency corresponding to a different waveguide mode.

\* \* \* \* \*